United States Patent [19]

Bertelsman et al.

[11] 4,394,455

[45] Jul. 19, 1983

[54] SPINEL SLIP CASTING COMPOSITION AND ARTICLES

[75] Inventors: Dale M. Bertelsman, Lake Jackson; William M. Eckert, Angleton; Stanley J. Morrow, Clute, all of Tex.

[73] Assignee: The Dow Chemical Company, Midland, Mich.

[21] Appl. No.: 298,048

[22] Filed: Aug. 31, 1981

Related U.S. Application Data

[63] Continuation-in-part of Ser. No. 217,712, Dec. 18, 1980, abandoned.

[51] Int. Cl.$^3$ .............................................. C04B 35/04
[52] U.S. Cl. ..................................... 501/117; 501/120
[58] Field of Search ................ 501/117, 120; 423/596, 423/600

[56] References Cited

U.S. PATENT DOCUMENTS

| | | | |
|---|---|---|---|
| 2,618,566 | 11/1952 | Robinson | 106/62 |
| 2,805,167 | 9/1957 | McCreight et al. | 106/62 |
| 3,516,839 | 6/1970 | Bruch | 106/62 |
| 3,530,209 | 9/1970 | Ho | 106/62 |
| 3,531,308 | 9/1970 | Bagley | 106/62 |
| 3,544,266 | 12/1970 | Palmour et al. | 106/62 |
| 3,567,472 | 3/1971 | Bratton | 106/62 |

FOREIGN PATENT DOCUMENTS

| | | | |
|---|---|---|---|
| 697231 | 9/1953 | United Kingdom | 106/62 |
| 449021 | 6/1975 | U.S.S.R. | 106/62 |

*Primary Examiner*—James Poer
*Attorney, Agent, or Firm*—G. R. Baker

[57] ABSTRACT

A spinel containing slip-casting composition, a method for preparing the spinel slip-casting composition and a method for casting the slip into usable forms are described. The spinel employed to prepare the castable slips is a pre-calcined spinel prepared in the manner of copending application Ser. No. 184,189, filed Sept. 4, 1980, which is ball-milled with water, then mixed with a deflocculant at pH 9 or below and optionally with a molding aid. The slurry or "slip" is cast into a mold porous to water until the desired thickness of solid has been obtained and the excess "slip" decanted or otherwise withdrawn from the mold i.e., drain cast method or the "slip" is solid cast and dried to produce a green solid casting. The green shape is retained in the mold until it gains green strength, 1 hour to 5 days, and thereafter placed in an oven wherein it is fired to above about 1400° C. for from 1 to 20 hours until it has reached its maximum density of between about 55 and 99 percent of theoretical. Also disclosed are mixtures of pre-fired spinels with calcined spinels of various heat histories to yield more durable green forms. In addition there is disclosed slips prepared from mixtures of different spinel compositions.

13 Claims, No Drawings

SPINEL SLIP CASTING COMPOSITION AND ARTICLES

CROSS REFERENCE TO RELATED APPLICATION

This application is a continuation-in-part of copending application Ser. No. 217,712, filed Dec. 18, 1980, now abandoned.

BACKGROUND OF INVENTION

Spinels are well known minerals having the generic structure $M^I M_2^{II} O_4$ wherein $M^I$ represents one or more metal atoms having a valence such that when chemically bound with metal atoms of $M^{II}$, which may be one or more metal atoms the same as or different from $M^I$ but having a different valence, exhibit a total combined valence taking into account the number of atoms in the formula as to equal eight (8). In the ruby spinel, iron, magnesium and aluminum combine in the generic formula as $Fe^{++}Mg^{++}(Fe^{+++}Al^{+++})_2O_4$. Man made spinels have also been made such as for example $Co^{++}(Co^{+++})_2O_4$, $Co^{++}(Al^{+++})_2O_4$, $MgAl_2O_4$, $(NiCo)Al_2O_4$, $(MgCo)Al_2O_4$ and the like.

Spinels disclosed in the prior art have been prepared by admixing the desired metals, as their oxides, in the theoretical proportions and heating them to temperatures above about 1500° C. where at no amount of continued heating at this temperature nor heating to a moderately higher temperature materially changes the density or crystalline structure. Of course extreme continued higher heating can change the crystalline structure to a structure not associated with the spinel structure. When spinels have been prepared in this manner the usual utility requires the spinel to be ground into a fine powder, mixed with a binder, shaped and the binder burned out. Such techniques have produced shapes which have a degree of porosity about that of any conventional construction using a binder to maintain such shape during firing.

With respect to prior art techniques used commercially for preparing ceramic spinels most employ the fusion technique of the metal oxides. This technique is not wholly satisfactory for the preparation of ceramic spinels because the metal atoms do not completely form into the spinel lattice structure; that is, some metal atoms form a segregated oxide phase admixed with the spinel lattice structure and once formed by fusion the crystals are not amenable to shaping by pressure and sintering without aid of binders which may be detrimental to acid and/or base resistance and physical properties of the finished product. Binders in ceramics made in this way make the body relatively porous when they are removed during or after shaping. Segregated ceramic binders may weaken the body because they are the site of differential expansion and contraction and/or chemical attack.

The prior art recognized the phenomena of spinel formation being a physio-chemical reaction based on thermal conditions such that, regardless of the ratio of the metals, some spinel lattice would form at the correct temperature, physical and chemical conditions, albeit those atoms not forming a spinel lattice structure remain as segregated phases of the metal oxides. The spinel shapes commercially available usually have been prepared from spinels produced from starting materials containing impurities of one or more segregated metal oxide phases and thus are relatively poor with respect to their physical properties, e.g., tensile strength, acid and/or base resistance and porosity.

Numerous patents and scientific literature have been published disclosing other techniques for preparing spinels (esp. $MgAl_2O_4$). Most procedures employ metal oxides or oxidizable compounds, both of which are converted to a spinel by firing or fusion with or without pressure.

In some patents a magnesium compound and an aluminum compound are mixed to give the requisite molecular constitution, wet ground and mixed, and fired at temperatures up to 3,000° F. (1660° C.) as for example, in U.S. Pat. No. 2,618,566 or shaped into pebbles before firing as in U.S. Pat. No. 2,805,167.

Others use pure magnesia and alumina mixtures which are then fired at 2150° C. and cooled slowly overnight, (e.g. U.S. Pat. No. 3,516,839). Still others mix alumina with magnesium nitrate, dry fire on a schedule to 1400° C., and then grind to obtain a powder, (e.g. U.S. Pat. No. 3,530,209). Another technique follows the fusion route of magnesium nitrate hexahydrate and ammonium aluminum sulfate dodecahydrate (both reagent grade) to 1300° C. to produce a fine powder, (e.g. U.S. Pat. No. 3,531,308). A magnesium-salt ($MgSO_4.7H_2O$), aluminum-salt ($Al_2(SO_4)_3.18H_2O$) mixture, co-crystal has been employed to prepare a powder which is then shaped into ceramic bodies by hot press techniques with or without the use of binders, (e.g. U.S. Pat. No. 3,544,266).

Concomitant with these developments researchers investigated the nature of metal double hydroxides formed by coprecipitation, some of which were shown to convert to a spinel upon calcination. Early work was performed by Feitnecht and his students who made a series of double hydroxides with Mg/Al ratios between 1.5 and 4 to 1, respectively, by coprecipitation from magnesium and aluminum chlorides, Helv. Chim Acta 25, 106–31 (1942), 27, 1495–1501 (1944). No change could be detected by X-ray diffraction techniques then available for different Mg/Al ratios or a certain degree of substitution by chloride for hydroxide. A similar double hydroxide, reported to be a hydrate even after heating to 150° C., was reported by Cole and Hueber in "Silicates Industriels" Vol. 11, pp 75–85 (1957). The compound was made by the reaction of NaOH with Al metal or $Al_2(SO_4)_3$ and MgO or $MgSO_4$ at 65°–70° C. The product had a Mg/Al ratio of 4/1 even when reactant proportions were varied. However, $Mg(OH)_2$ was observed as a second phase in some cases.

More recently, Bratton in both Journal of The American Ceramic Society, Vol. 52, No. 8 (2969), and Ceramic Bulletin, 48, #8 pp 759–62 (1969) and 48, #11, pp 1569–75 (1969), reported the coprecipitation of numerous magnesium and aluminium chlorides and oxalates which on heating, drying, calcining or firing, exhibited a spinel x-ray diffraction crystallographic pattern. The coprecipitation product resulted in a magnesium aluminum double hydroxide of composition $2Mg(OH)_2.Al(OH)_3$, plus a large amount of segregated gibbsite $Al(OH)_3$ phase (see also U.S. Pat. No. 3,567,472). This is presumably the same product Feitnecht obtained.

Bakker and Lindsay in "Ceramic Bulletin" Vol. 46, No. 11, pp 1095–1097 (1967) report that a high density spinel body can be made from $Mg(OH)_2$ and $Al(OH)_3$ if 1.5% $AlF_3$ is added as a mineralizer.

In the works cited above these powders were, in some instances, calcined then fired while in other instances the powders were heated through the calcining range and ultimately through the firing and even the fusion range. Early work was directed to preparing spinel usable as a decolorant, U.S. Pat. Nos. 2,395,931 and 2,413,184 or antacids, U.S. Pat. Nos. 3,323,992 and 3,300,277. In the last case a "highly hydrated magnesium aluminate" is claimed as a new composition of matter, the formula of which is $Mg(OH)_2 \cdot 2Al(OH)_3 \cdot XH_2O$ where $X=4$ to 8. The material is prepared by the reaction of $NaAlO_2(Na_2Al_2O_4)$, $NaOH$ and $MgCl_2$ as aqueous solutions at a pH from 8–9. Bratton in U.S. Pat. No. 3,567,472 also discloses coprecipitation of a magnesium and aluminum chloride from a solution having a pH from 9.5 to 10, drying or firing to obtain a light-transmitting spinel by adding CaO.

Recently co-workers have developed a technique for preparing spinel precursor powders and spinel powders which can be shaped under mild pressure without binders and fired with resultant densification of the spinel powder into a solid substantially non-porous body approximating 95 to 100% of the theoretical density.

While pressure molding techniques are commercially desirable for large shapes such as fire brick and the like, it would be advantageous to be able to slip-cast the spinel powders by drain casting for use in making intricate shapes such as furnace ware, crucibles and the like as well as solid casting for preparing bricks or the like. Previous attempts to slip-cast the spinel after firing the powders of course met with failure as did the first attempts to slip-cast the precursor calcined spinel powders of our co-workers.

BRIEF DESCRIPTION OF THE INVENTION

In accordance with another embodiment of the present invention a precipitate of metal hydroxides or compounds convertible to the hydroxide in metal atomic proportions of $M^I/2M^{II}$, eg. $Mg \cdot Al_2OH_8$, is calcined at a temperature of from 400° C. to 1400° C. during which period the hydroxide form is converted to the spinel structure $M^I M^{II}_2 O_4$. This calcined product is then slurried in water employing an amount of de-flocculating agent which is a salt of a polyelectrolyte in an amount and kind such as to yield a well dispersed, solid phase in the water, and a pH of slurry of about 9 or below, and preferably about 9, with or without a conventional binding agent for slipcasting. The resulting slurry can be slip-cast, as for example, by drain casting into water-porous molds wherein the solids build up on the mold walls. After achieving the desired wall thickness the liquid remaining in the mold cavity is poured out and the mold left to dry until the green strength of the casting has matured to enable removal of the mold. Following removal from the mold the "green" casting is dried in air at room temperature or forced air or even excitation drying (microwave), or other internal to external drying process. Thereafter, the "green" casting is heated (hereafter referred to as "fired" or "sintered," that is, subjected to heat for a period of time to achieve a stable density at that temperature of the solid shape) to above 1400° C. for from 1 to 20 hours during which time the spinel densifies and the casting dimensions may be reduced up to 50%. The resulting object comprises a 100% spinel composition with no binders or other organic materials being present since such binders or materials are decomposed under the extreme heat the article has all of the expected characteristics of the spinel and is a substantially non-porous body having heat and cold shock resistance (i.e. resistance to sudden changes in temperature), inertness to oxidation and reduction at temperatures below its melting point and resistance to acid and base attack.

It is of course to be understood that while slip-casting has been described, centrifugal-casting or other forms of drain casting from slurries can be employed with equal success. In addition, solid casting from slips has produced useful forms, i.e. bricks.

Suitable polyelectrolytes, useful primarily as de-flocculants but having some binding tendency, are those alkali metal and ammonium salts of carboxylated polyelectrolytes such as DARVAN® No. 7 and DARVAN® C, respectively, manufactured by R. T. Vanderbilt Company, Inc. which can produce a pH of solution or slurry of about 9 and below, and their equivalents known in the art.

Thus, it has now been found, for example, if a magnesium compound such as, magnesium hydroxide, or the chloride, hydroxychloride, sulfate, phosphate, acetate, nitrate, halide, carbonate, bicarbonate, and the like, is coprecipitated with an aluminum compound, such as aluminum hydroxide, or the chloride or sulfate, at a pH to coprecipitate the compounds, at least one of the metals is converted to its respective hydroxide or partial hydroxide during the coprecipitation, followed by washing with or without alkalinity before recovering the coprecipitate there is obtained a product having the following compositions upon drying at approximately 125° C. for several hours:

$$(1 + z) M^I {}^a_b X^b_a \cdot 2 M^{II} {}^c_d Y^d_c$$

wherein each X and Y is independently selected from the aforementioned anions and at least one X and/or Y is —OH and z represents a number less than 3 and preferably about 1, and where when z is greater than 0 there will be present at least one segregated phase, as for example in the magnesium-aluminum coprecipitate an aluminum phase of $Al(OH)_3$ and/or $AlO(OH)$, and wherein "a" times the number of atoms of $M^{I(b)}$ equals the valence b of X times a, the number of atoms of X, and similarly c times the number of atoms of $M^{II(d)}$ equals the valence d of Y times c, the number of the atoms of Y, the $M^{II}/M^I$ ratio in the total coprecipitate being maintained at about 2 to 1 respectively, and having a volatile content of about 40% by weight when a Cl atom is present and about 36% by weight when all the X and Y's are —OH moieties, (analysis by thermogravimetric analysis). The exemplified coprecipitate is not a hydrate and the individual crystallities have $M^{II}/M^I$ ratios significantly different from those previously reported as shown by micro-area X-ray fluorescence, electron diffraction and high resolution X-ray diffraction. The dried precipitate is thereafter calcined at between about 400° C. and 1400° C. for from typically about 4 hours to about 1 hour, respectively. The calcined precipitate has an X-ray diffraction pattern of the spinel structure, for example, $MgAl_2O_4$.

Spinels are well known metal oxides having a specific structural configuration and having a generic formula $M_3O_4$ where M is at least two metal atoms $M^I$ and $M^{II}$, which may be the same or different metal elements, having different valences whose sum of products of the valence times the number of atoms of each valence equal, preferably eight but may vary up to 10 percent excess or deficiency from eight. Exemplary of the common formula are $ZnCo_2O_4$ and $MgAl_2O_4$ where the sum of the product of the valence times the number of atoms equals eight. Exemplary of imbalanced stoichiometry, excess and deficient atom structures, are e.g., $Mg_{0.9}Fe_{0.11}Al_2O_4$, and $Ni_{0.2}Co_{0.79}Al_2O_4$.

In addition to the basic spinel, numerous mixed spinels were prepared. Mixed spinels can be made in any one of several ways. The preferred way is to add the desired metal at the coprecipitation step. However, this may not always be practical, or the hydroxides may have such a large difference in solubility that a coprecipitate with the desired composition is not formed. The second method of preparation is to mix the separately prepared compounds in the desired ratio. This requires only a knowledge of the metal content by, say, X-ray fluorescence. The mixture may be ground intimately if a homogeneous composition (e.g. one mixed phase such as $Mg_{0.3}{}^{+2}Co_{0.7}{}^{+2}Al_{1.3}{}^{+3}Co_{0.7}{}^{+3}O_4$) is desired. It is also to be recognized that when the "mixed spinels" are desired and the third metal is or two or more additional metals are added at the coprecipitate stage the pH for coprecipitation may have to be varied. For example when chromium is added the pH is adjusted to about 9.7 to insure coprecipitation of all three metals in, for example, a Mg/Al/Cr system. Alternately, a dry mixture may be mixed poorly, or a gross disparity in the particle size distribution of the starting materials may be introduced, if a range of compositions is desired (e.g. $Mg_x{}^{+2}Co_{1-x}{}^{+2}Al_{2-y}{}^{+3}Co_y{}^{+3}O_4$, where x and y vary from region to region in the mass). The most preferred way to prepare a range of solid solutions within one sample is to add at least one of the metals as the hard burned oxide which limits its reactivity. One should not assume that the same effect will be achieved if the preburned oxide is the spinel component versus it being the additive metal. In general, the higher the preburned component has been calcined, the lower its activity will be toward solid solution formation. In some cases part of the additive metal may enter the spinel structure and part may form a separate oxide phase. In addition, a doping metal compound may be added to the pre-calcined or post-calcined spinel and may exhibit phase segregation or solid solution formation, depending on its reactivity and that of the spinel phase.

In accordance with the present invention, the method of copending application Ser. No. 184,189, filed Sept. 4, 1980, entitled Magnesium Aluminum Spinels, Walter W. Henslee, et al., which is incorporated by reference herein, a portion set forth above, the precursor spinels can be prepared by coprecipitating metal compounds, that is the metal halides, sulfates, formates, hydrogen phosphate, hydroxides, acetate, nitrate, carbonate, bicarbonate and the like, or mixtures thereof including hydroxycarbonate, chlorohydroxide, the halogenated carboxylates, in a proportion and kind to provide metal atoms of two different valences, albeit they may be the same metal or different metals, to total eight, plus or minus about 10%, positive valences available to combine with four oxygen atoms in the generic stylized formula $M_3O_4$ (or $MM_2'O_4$). The coprecipitation produces, when conducted at the pH at which coprecipitation occurs (usually between about 9 and 9.5 for Mg/Al, and preferably washed, and more preferably washed with an alkaline solution), a product having a specific layered crystalline structure which may or may not contain a segregated aluminum hydroxide or oxyhydroxide phase. The coprecipitate is dried and calcined at between about 400° C. to about 1400° C. and preferably between about 900° C. to about 1400° C., thereby forming the crystal lattice of the spinel structure with little or no segregated phases of either metal.

It is usually advantageous to add such deflocculants and other dispersants such as TRITON® X-100 and HCl (pH 2 or greater), and molding aids such as the algins and the like.

Good results have been achieved when using 10 to 60% solids in water and from 0.1 to 4 weight percent of a deflocculant with or without a mold aid such as an alginate, KELTEX®, for example. The solids content is preferably from 0 to 90% by weight fired (sintered) spinel and from 10 to 100 percent by weight spinel calcined at a temperature of from 900° C. to 1400° C. It is of course to be understood that some part of the calcined material may also be replaced with spinel calcined at a temperature of from 400° to 900° C. to control porosity if such is desirable. Of course, mixtures of metals, metal oxides and mixtures of different metal spinels may also be used as the solids content.

DETAILED DESCRIPTION OF THE INVENTION

Slip Casting

A $MgAl_2O_4$ spinel powder calcined to about 900° C. to 1400° C., prepared according to the previous procedure of U.S. Ser. No. 184,189 filed Sept. 4, 1980, and was ballmilled with water and the enumerated dispersants/deflocculants added. The slip was re-ballmilled and then poured into various molds, which had the ability to absorb water from the slip. When the slip had built up on the wall of the mold to the desired thickness the excess liquid in the mold was poured out and the mold with its lining of slip solids was set aside for a period of time to further dry and gain strength accompanied by a shrinkage away from the mold which can be controlled by the amount of sintered spinel used in the slip. When the strength of the solids was sufficient the mold was parted and the green shape removed and further slowly dried. Thereafter the green shape was fired at a temperature above 1400° C., preferably above 1500° C., for several hours. The final product is a translucent body of about one-half the dimension of the green shape and will have a density of between 95 and 99% of the theoretical density for the spinel.

Solid Casting

The present invention also contemplates using solid casting techniques wherein the slurries can vary in solids content and the ratios of the calcined to sintered (fired) spinel particles in the slurry can vary from 10% to 100% by weight calcined spinel to 90% to 0% by weight fired (sintered) spinel depending upon the nature of the shape and its intended use. For example, a fire brick for use in a coal fired boiler can be prepared by mixing from 10 to 60 percent by weight of calcined spinel with from 90 to 40 percent by weight fired (sintered) spinel (spinel which had been calcined at a temperature of 1400° C. and thereafter in granular or powder form fired (sintered) at a temperature above about 1500° C.) with the appropriate deflocculants and/or molding aids and water to produce a 40 to about 60 percent solids slurry with or without porosity control agents being added and solid casting techniques employed to produce a shape capable of being fired.

Various dispersing agents which have the ability to prevent flocculation of the fine particles of calcined spinel were used to determine their effectiveness.

EXAMPLES

Fifty-nine (59) grams of a −325 mesh magnesium aluminum spinel, $MgAl_2O_4$, prepared in accordance with copending application Ser. No. 184,189, Example 8 which had been calcined at a temperature of 900° C., was mixed well with 120 grams of water and aged for 16 hours.

Thereafter seven (7) grams of a viscous solution (obtained by mixing 30 grams precursor of the same batch spinel ballmilled to −325 mesh mixed with 70 grams of 15% phosphoric acid and 8 grams of deionized water) was mixed with the aged slurry and thereafter an additional 30.6 grams of (U.S. Standard) −325 mesh spinel calcined at a temperature of 900° C. was also added to the slurry. After mixing well, the resulting slurry was poured into a plaster-of-paris mold treated with a silicon mold release agent. The molded articles were released from the mold two (2) minutes after being poured.

This slip was too thin to be of practical utility for drain cast methods and the green strength of the casting was too weak to be of practical utility.

In an effort to improve the quality of the slip and the green strength another composition was prepared from the same batches of materials but a greater concentration of the $H_3PO_4$/fired spinel was added.

| | |
|---|---|
| 563 g | −325 mesh $MgAl_2O_4$ spinel (calcined @ 1400° C.) |
| 120 g | −100 mesh $MgAl_2O_4$ spinel (calcined @ 1400° C.) |
| 30 g | viscous solution above described |
| 360 g | water |

The mixture was well mixed and poured into a plaster-of-paris crucible mold and after a sufficient wall thickness had built up the excess slip was drained off. The casting took ten (10) minutes to free itself from the mold but began to develop cracks on drying further.

Subsequent slips were prepared using various recognized slip molding aids such as TRITON ® X-100 (dispersant), CARBOPOL ® 934 and KELTEX ® (alginate). Castings formed from use of these aids were poor, some caused foaming and all the castings cracked. This is believed to have been caused by the absence of a binder or deflocculant and the foaming action of some of the above agents.

In still another experiment 80 cc of KELTEX ® as a 0.5% solution; 5 cc CARBOPOL ® 934 as a 1% solution; 4.5 grams DARVAN ® 7; 65 cc water and 100 grams of the spinel ($MgAl_2O_4$) powder calcined at a temperature of 1300° C. were well mixed. The slurry had a pH of 8–9. The slurry was poured into a cube mold treated with 0.2% KELTEX ® as a mold release agent and set aside to dry. The casting shrank away from the mold sides and was easily removed. No cracks appeared at any surface.

Still another slurry was prepared, comprising 160 g of a 0.5% aqueous KELTEX ® solution; 4.5 g DARVAN ® 7 and 100 g of spinel powder calcined at a temperature of 1300° C. The slurry was well mixed, poured into a cube mold treated with 0.2% KELTEX ® mold release agent. The drain cast method was employed. A one hour casting time followed by decanting of the remaining liquid, resulted in a 3/32 inch wall thickness of the five sided open top cube form. Although the casting cracked at the interior corners on drying following removal from the mold, the outside corners remained sharp and the casting was therefore still satisfactory.

The following composition was prepared and used to cast several shapes.

| | |
|---|---|
| 6160 g | KELTEX ® 0.5% solution |
| 119 g | DARVAN ® C |
| 209 g | DARVAN ® 7 |
| 6317.6 g | spinel powder (calcined at 1200° C.) |
| 2235.8 g | spinel powder (sintered at 1535° C.) |

The spinel powders were ballmilled together for 26 hours, then the liquids were added and ballmilling continued for 36 hours. Seven days later the slip was used to cast, by the cast-drain technique, a furnace crucible, a cup mold prepared from a foam hot-cold beverage cup, each from plaster-of-paris; three commercial molds, a mug with handle, a mug with separate handle mold and a bowl, each from No. 1 pottery clay. The castings were made at about 1 hour casting time followed by slip decanting and drying in the mold for about 2 hours before removal of the casting from the mold. The casting was dried overnight at room temperature then two days at 120° C. and ultimately fired (sintered) at a temperature of about 1535° C. The castings densified to about the theoretical density for the spinel and were reduced in all dimensions to about one-half the unfired (unsintered) dimensions. Articles from these castings were translucent and crack free with the exception of the mug with handle attached which lost the handle due to shrink cracking on removal from the mold.

Ten days later, twenty-three days after the slip was prepared, castings were attempted with no success. The apparent reason is the suspected breakdown of the KELTEX ® (sodium alginate). This experiment suggests a preservative is necessary if the casting operation is to be carried out over an extended period of time (severals days to weeks) after the slip has been made.

Another slip was prepared using

| | |
|---|---|
| 328 g | DARVAN ® 7 |
| 6160 g | KELTEX ® 0.5% solution |
| 2236 g | spinel powder (sintered at 1535° C.) |
| 6318 g | spinel powder (calcined at 900° C.) |

Again the dry powder spinels were ballmilled together for 24 hours, the remainder of the ingredients added and the resulting mixture ballmilled for 24 hours then aged for one week. Thereafter, the slip was used to cast a cup and a bowl. Castings cracked on drying in the mold before removal and after removal. Analysis of the grain size and shapes of the ballmilled slurry solids and the previous prepared slurry solids showed the former to be sharp edged whereas the latter were smoother, more round in character. The conclusion drawn from this experiment is that the calcined material must be calcined at a temperature above 900° C. and preferably at a temperature of from 1200° C. to about 1400° C. to obtain the more round powder particles.

In still another experiment a slip was made using only DARVAN ® 7 (328 g), 8553 g 1200° C. calcined spinel and 6160 g 0.5% KELTEX ® solution. The castings cracked. Modification of this recipe to include a sintered spinel was no more successful. Further modification of the recipe to include DARVAN ® C in addition to DARVAN ® proved successful.

In addition, using the scrap obtained by pulverizing either calcined or sintered scrap pieces as well as wet green castings redispersed, and employing a deflocculating agent, a small amount of water and ballmilling the slip for about 24 hours, good castings were prepared, dried and sintered. Vacuum decanting is advantageous since the "decant-line" does not form.

Mg(Cr—Al$_2$)O$_4$ was prepared in accordance with example 11 of Ser. No. 184,189 having the formula MgAl$_4$Cr$_{2-x}$O$_4$ as given in the copending application and used in the following manner in accordance with the present invention.

| 653 g | MgAl$_x$Cr$_{2-x}$O$_4$ (calcined at 1400° C.) |
|---|---|
| 25 g | DARVAN® C |
| 2.8 g | KELTEX® (sodium Alginate) |
| 450 g | H$_2$O | was ballmilled for 16 hours then slip cast. The material cast easily and on firing (sintering) produced a crack-free cup without handle. Shrinkage was about 50%, density about theoretical.

The same formulation was used except that MgAl$_2$O$_4$ was substituted for the Mg(CrAl)$_2$O$_4$

| 653 g | MgAl$_2$O$_4$ (calcined at 1400° C.) |
|---|---|
| 25 g | DARVAN® C |
| 2.8 g | KELTEX® |
| 450 g | H$_2$O |

This slip also cast satisfactorily. The castings sintered to a density of 92% of theoretical.

This system of slip casting can be employed with any type of one, two or more metal spinels if the material is coprecipitated and properly calcined. Also spinels combined with other ceramic materials capable of forming a slurry can be slip cast. Examples of other materials are various oxides (Al$_2$O$_3$, SiO$_2$, Kaolin, etc.) as well as oxides, such as MgO, that hydrate can be cast using cold water and allowing the material to age (hydrate) before casting. The additive oxide powders that hydrate should have low surface area too.

What is claimed is:
1. A casting composition comprising
   (A) 10 to about 60 percent by weight of a powder of a spinel prepared by coprecipitation of metal hydroxides or metal compound convertable to the metal hydroxides, dried and calcined to between about 400° and 1400° C.; and
   (B) the balance water and a sufficient deflocculating agent to form a substantially stable dispersion of the powder.
2. A casting composition comprising
   (A) 10 to about 60 percent by weight of a spinel powder
   (1) at least 10 percent of which is a coprecipitate precursor calcined at a temperature greater than 900° and up to 1400° C.;
   (2) up to 90 percent of a 1500° C. and above fired precalcined coprecipitate precursor; and
   (3) the balance, if any, of a coprecipitate precursor calcined at a temperature of from 400° to 900° C.; and
   (B) the balance being water and sufficient deflocculant to form a stable dispersion of the powders.
3. A slip casting composition comprising
   (A) 0 to 25 weight percent of a spinel powder fired to about 1500° C.;
   (B) 10 to 50 weight percent of a spinel powder calcined to between about 900° and 1400° C.;
   (C) 25 to 90 percent by weight of water;
   (D) 0.2 to 4 percent by weight of a mold aid; and
   (E) 0.1 to 4 percent by weight of a deflocculating agent.
4. The composition of claim 1, 2 or 3 wherein said spinel is a MgAl$_2$O$_4$ spinel.
5. The composition of claim 4 wherein said mold aid is an alginate and said defloccculant is a polyelectrolyte.
6. The composition of claim 1, 2 or 3 wherein said spinel is a Mg(Al$_x$Cr$_{2-x}$)O$_4$ spinel.
7. Furnaceware prepared by slip casting the composition of claim 4 and firing the so cast shape at above 1500° C. for one to twenty hours.
8. Furnaceware prepared by slip casting the composition of claim 5 and firing the so cast shape at above 1500° C. for one to twenty hours.
9. Furnaceware prepared by slip casting the composition of claim 6 and firing the so cast shape at above 1500° C. for one to twenty hours.
10. Solid shapes prepared by solid casting a slurry of the composition of claim 4 and firing the dried shape so cast to above 1500° C. for from one to twenty hours.
11. Solid shapes prepared by solid casting a slurry of the composition of claim 5 and firing the dried shape so cast to above 1500° C. for from one to twenty hours.
12. Solid shapes prepared by solid casting a slurry of the composition of claim 6 and firing the dried shape so cast to above 1500° C. for from one to twenty hours.
13. The casting composition of claim 1, wherein at least 10 weight percent of spinel powder is a coprecipitate precursor calcined at a temperature of from 900° C. to 1400° C.; up to 90 weight percent of the precalcined coprecipitate precursor is sintered at a temperature above 1500° C.; and the balance, if any, is a magnesium-/aluminum coprecipitate comprised of a layered crystallite having the structure

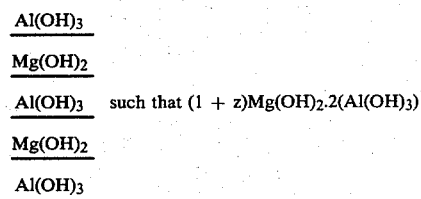

and at least one segregated phase of the formula AlO(OH) and/or Al(OH)$_3$ wherein the overall stoichiometry of the precipitate is MgAl$_2$(OH)$_8$.

* * * * *